(12) United States Patent
Ogawa (10) Patent No.: US 7,057,831 B2
(45) Date of Patent: Jun. 6, 2006

(54) OPTICAL SYSTEM

(75) Inventor: Hideki Ogawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 11/045,742

(22) Filed: Jan. 28, 2005

(65) Prior Publication Data

US 2005/0168841 A1  Aug. 4, 2005

(30) Foreign Application Priority Data

Jan. 30, 2004  (JP) ..................... 022743

(51) Int. Cl.
*G02B 15/14* (2006.01)

(52) U.S. Cl. .............. 359/795; 359/691; 359/680

(58) Field of Classification Search ............ 359/795, 359/793, 785, 784, 783, 782, 781, 779, 691, 359/690, 689, 686, 688, 680
See application file for complete search history.

(56) References Cited

U.S. PATENT DOCUMENTS

| | | | |
|---|---|---|---|
| 3,480,453 A | 11/1969 | Reid et al. | |
| 4,241,983 A | 12/1980 | Kitagishi | ............... 359/746 |
| 4,348,084 A | 9/1982 | Kitagishi et al. | ........... 359/745 |
| 4,913,535 A | 4/1990 | Robb | ............... 359/665 |
| 4,966,448 A | 10/1990 | Robb | |
| 5,345,337 A | 9/1994 | Sigler | |
| 5,629,799 A | 5/1997 | Maruyama et al. | ......... 359/565 |
| 5,638,215 A | 6/1997 | Neil | |
| 5,790,321 A | 8/1998 | Goto | ............... 359/742 |
| 6,081,389 A * | 6/2000 | Takayama et al. | ......... 359/680 |
| 6,115,188 A | 9/2000 | Nishio et al. | ............... 359/690 |

FOREIGN PATENT DOCUMENTS

| | | |
|---|---|---|
| EP | 0 750 205 B1 A1 | 2/2002 |
| GB | 1196339 | 6/1970 |
| JP | 60-49883 B2 | 11/1985 |
| JP | 60-55805 B2 | 12/1985 |
| JP | 6-324262 A | 11/1994 |
| JP | 6-331887 A | 12/1994 |
| JP | 11-119092 A | 4/1999 |

OTHER PUBLICATIONS

European Patent Office; "European Search Report"; of corresponding European Patent Application No. EP 05 25 0449; date of mailing Jun. 1, 2005; (4 pages).

* cited by examiner

*Primary Examiner*—Timothy Thompson
(74) *Attorney, Agent, or Firm*—Morgan & Finnegan, LLP (57) ABSTRACT

An optical system of a telephoto type is disclosed, in which a refractive optical element made of a solid material that satisfies $vd<30$, $\theta gd<-3.333\times10^{-3}\cdot vd+1.40$ and $\theta gF<-2.615\times10^{-3}\cdot vd+0.67$ is installed, vd representing an Abbe's number, and $\theta gd$ and $\theta gF$ representing partial dispersion ratios. A refractive power with adequate sign is given to the refractive optical element in accordance with its location. Thereby, an optical system, which can excellently correct various aberrations such as chromatic aberration, and can be manufactured easily, and has an excellent environment resistance, is realized.

42 Claims, 6 Drawing Sheets

OPTICAL SYSTEM

BACKGROUND OF THE INVENTION

1. Field of the Invention

The present invention relates to an optical system, which is suitable for optical apparatuses such as cameras for silver-haloid films, digital still cameras, video cameras, telescopes, binoculars, and projectors.

2. Description of the Related Art

In general, in optical systems used for image-taking apparatuses such as digital cameras and video cameras, the optical performance thereof tends to be decreased by increase of various aberrations, especially longitudinal chromatic aberration, chromatic aberration of magnification and the like, with shortening the total lens length (total optical length; the length from a first lens surface on an object side to an image plane) for attempting the miniaturization of the entire optical system. Especially, in an optical system of a telephoto type whose lens length is shortened, lengthening its focal length increases chromatic aberrations.

As methods for reducing such chromatic aberrations, the use of an anomalous partial dispersion material as an optical material and the use of a diffraction optical element in an optical path are well known.

In the telephoto type optical systems, generally, a lens unit that is located on the front side of a pupil, where passing heights of a paraxial marginal ray and a paraxial chief ray from the optical axis become relatively large, is constituted by a lens having a positive refractive power, which is formed of a low dispersion optical material with anomalous partial dispersion such as fluorite, and a lens having a negative refractive power, which is formed of a high dispersion optical material to reduce the chromatic aberrations. Such various telephoto type optical systems have been proposed (see Patent Documents 1 to 3).

Moreover, an example that the chromatic aberrations of the telephoto type optical system were corrected by using a diffraction optical element, without using the anomalous partial dispersion material, is also known (see Patent Documents 4 and 5).

Generally, the absolute value of a numerical value corresponding to Abbe's number of a diffraction optical element is a small number of 3.45. Therefore, the diffraction optical element is characterized in that the slight change of its power (a power is the reciprocal of its focal length) by diffraction causes the great change of the chromatic aberrations with little impact on spherical aberration, coma aberration, astigmatism or the like. Moreover, the power changes linearly for the change of wavelength of incident light because the light treated is diffraction light. Thereby, the wavelength characteristic of chromatic aberration coefficients forms a complete straight line.

Therefore, aberration corrections specialized for the spherical aberration, coma aberration, and astigmatism are chiefly required when shortening the total lens length. On the other hand, since the correction of the chromatic aberration of magnification is performed by using a diffraction optical element, the optical system can be designed only by optimizing grass materials and power of constituent lenses so that linearity of the wavelength characteristic of chromatic aberration coefficients may be obtained, without a consideration for the absolute amount of the chromatic aberration deteriorating due to the total length shortening. As a result, an optical system of the telephoto type whose total lens length is shortened can be obtained.

Moreover, a liquid material, with comparatively high dispersion and a property like anomalous partial dispersion, is known as an optical material having a chromatic aberration correction action that is similar to a diffraction optical element, an optical system with the liquid material having been proposed (see Patent Document 6).

[Patent Document 1]
Japanese Examined patent application No.S60-49883 (corresponding to U.S. Pat. No. 4,241,983)

[Patent Document 2]
Japanese Examined patent application No.S60-55805 (corresponding to U.S. Pat. No. 4,348,084)

[Patent Document 3]
Japanese Patent Laid-Open Application No.H11-119092 (corresponding to U.S. Pat. No. 6,115,188)

[Patent Document 4]
Japanese Patent Laid-Open Application No.H6-324262 (corresponding to U.S. Pat. No. 5,790,321)

[Patent Document 5]
Japanese Patent Laid-Open Application No.H6-331887 (corresponding to U.S. Pat. No. 5,629,799)

[Patent Document 6]
U.S. Pat. No. 4,913,535

In the telephoto type optical systems, which use fluorite or the like as optical materials, disclosed in Patent Documents 1 to 3, when the total lens length is set comparatively long, the correction of the chromatic aberration is easy. However, shortening the total lens length causes the increase of the chromatic aberration, and thereby the excellent correction thereof becomes difficult. This is because, in these optical systems, the chromatic aberration generating in a front lens system with a positive refractive power is merely reduced by the use of low dispersion and anomalous partial dispersion of the material such as fluorite.

When the chromatic aberration that was deteriorated by shortening the total lens length is corrected by using a low dispersion grass with a large Abbe's number such as fluorite, since the chromatic aberration does not change greatly without the great change of the refractive power of the lens surface is not greatly changed, it becomes difficult to correct both the chromatic aberration and various aberrations such as spherical aberration, coma aberration and astigmatism that are generated by enlarging the refractive power.

On the other hand, though the diffraction optical element has an enough correction action for the chromatic aberration, it generates diffraction light of unnecessary diffraction order other than diffraction light of a designed diffraction order that is actually used. The unnecessary diffraction light becomes colored flare light deteriorating the image formation performance of the optical system.

There is a method for reducing the unnecessary diffraction light, which uses a so-called laminated diffraction optical element that a plurality of blaze type diffraction gratings are laminated in the optical axis direction, the laminated diffraction optical element concentrating energy into the designed diffraction order to reduce the unnecessary diffraction light. However, the problem that flares produced by the unnecessary diffraction light appears when taking images of high luminance objects, still remains.

Moreover, a production method of diffraction optical elements, which molds a resin material such as UV-curable resin, is known. However, since this method requires a very high molding accuracy because the diffraction efficiency of the diffraction optical element is sensitive to manufacturing error, it causes a high manufacturing cost.

Since the material disclosed in Patent Document 6 is a liquid material, the structure to seal it is needed. Therefore, the use of the material makes the manufacture of the optical system difficult. Moreover, since there is a problem of the change of characteristics such as a refractive index and dispersion by temperature, too, it cannot be said that the environment resistance of the material is enough. In addition, there is a fault that the sufficient correction action of the chromatic aberration is hard to obtain because an interface with air cannot be formed, in addition to a comparatively large Abbe's number and comparatively small anomalous partial dispersion.

BRIEF SUMMARY OF THE INVENTION

The present invention was made based on the above-mentioned problems of the conventional examples, and it is an object of the present invention is to provide an optical system, which can excellently correct various aberrations such as chromatic aberration, and can be manufactured easily, and has an excellent environment resistance.

An exemplified optical system of the present invention is a so-called an optical system of a telephoto type, in which its total lens length is shorter than its focal length. The optical system comprises a refractive optical element having refractive surfaces on a light-incident side and a light-emergent side, the refractive optical element being made of a solid material that satisfies the following conditions:

$\nu d < 30$ $\theta gd < -3.333 \times 10^{-3} \cdot \nu d + 1.40$ $\theta gF < -2.615 \times 10^{-3} \cdot \nu d + 0.67$ where $\nu d$ represents an Abbe's number, and $\theta gd$ and $\theta gF$ represent partial dispersion ratios.

Furthermore, the optical system is characterized in that, the refractive optical element has a negative optical power in a case where the refractive optical element is located on a front side (an object side or magnifying side) of a pupil position, and the refractive optical element has a positive optical power in a case where the refractive optical element is located on a rear side (an image side or demagnifying side) of the pupil position.

In the present invention, the definition of Abbe's number $\nu d$ and partial dispersion ratios $\theta gd$ and $\theta gF$ is the same as that commonly used, it being shown by the following equations:

$\nu d = (Nd-1)/(NF-NC)$ $\theta gd = (Ng-Nd)/(NF-NC)$ $\theta gF = (Ng-NF)/(NF-NC)$.

where refractive indexes for the g-line, F-line, d-line and C-line are represented by Ng, NF, Nd and NC, respectively.

Furthermore, a solid material in the present invention indicates a material that is solid in a state in which the optical system is used, not indicating that it is solid before the optical system is used, such as a manufacturing process. For instance, even if the material was liquid when manufacturing, a material cured from the liquid material is also included in the solid material of the present invention.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiments of the present invention by referring to the accompanying drawings.

The optical system of the present invention is used for image-taking apparatuses such as digital cameras, video cameras and silver-haloid film cameras, optical apparatuses such as an observation apparatus such as a telescope and binoculars, copiers, and projectors. The optical system of the present invention is characterized in adopting a telephoto type (optical system whose total lens length is shorter than its focal length), and giving a refraction action to a solid material with high dispersion and a low partial dispersion ratio.

The solid material with high dispersion and a low partial dispersion ratio, which is used in the present invention, indicates a material that is solid in a state in which the optical system is used; it may be in any states before the optical system is used, such as a manufacturing process. For instance, even if the material was liquid when manufacturing, a material cured from the liquid material is also included in the solid material of the present invention.

Figure 1:
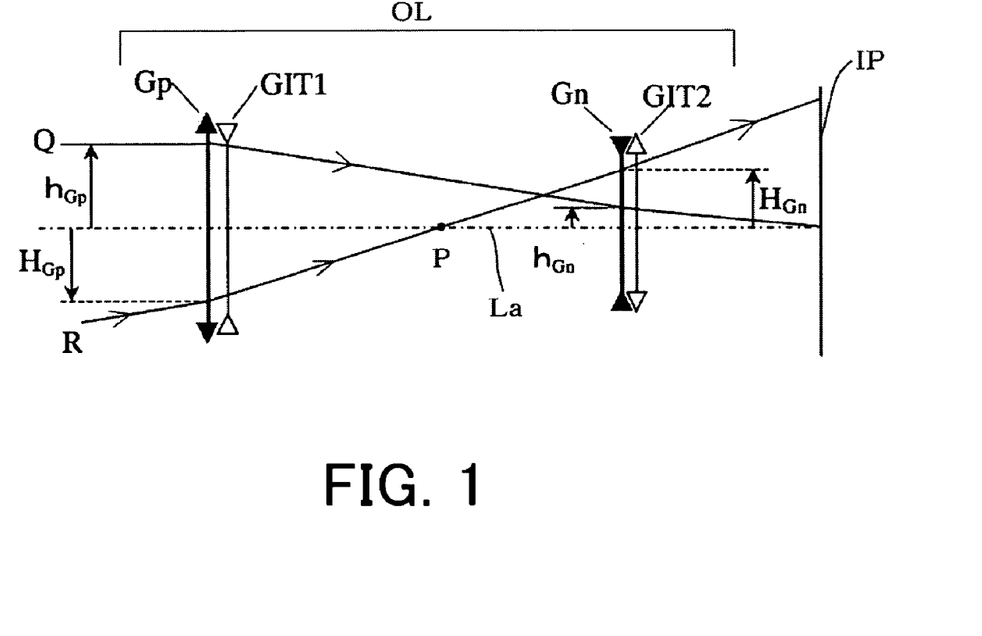
FIG. 1 is a schematic view showing a paraxial arrangement for explaining optical actions of an optical system in the present invention.

FIG. 1 is a schematic view showing a paraxial arrangement for explaining optical actions of the optical system in the present invention. In FIG. 1, the reference character OL denotes an optical system of a telephoto type whose total lens length (distance from a first lens surface to an image plane) is shorter than its focal length. The reference characters Gp and Gn denote a front unit with a positive refractive power (the optical power is the reciprocal of its focal length) and a rear unit with a negative refractive power, respectively, the units constituting the telephoto type optical system OL. The reference characters GIT1 and GIT2 denote refractive optical elements GIT made of a material that satisfies the following conditional expressions (1) to (3), which are introduced into the front unit Gn and rear unit Gp, respectively.

For simplifying the structure, each of all lenses constituting the front unit Gn and rear unit Gp is a thin single lens, and the lenses are arranged on an optical axis in the front unit Gn and rear unit Gp, respectively, with a distance of 0. Moreover, each of the refractive optical elements GIT1 and GIT2 is also a thin single lens, and they are arranged on the optical axis La in the front unit Gn and rear unit Gp, respectively, with a distance of 0. The reference character Q denotes a paraxial marginal ray, the reference character R denotes a paraxial chief ray, and the reference character P denotes a crossing point where the paraxial chief ray R crosses the optical axis La, the point P corresponding a pupil center (for instance, the center of an aperture stop). The reference character IP denotes an image plane.

The "paraxial marginal ray" is a paraxial ray generated when the light having a height of 1 from the optical axis of the optical system enters the optical system, parallel to the optical axis, in a case where the focal length of the entire optical system is normalized to 1.

Here, in the following explanation, an object is located at the left of the optical system in the figure, and a ray enters the optical system from the object side progresses from the left to the right.

The "paraxial chief ray" is a paraxial ray that passes through the crossing point of the entrance pupil of the optical system and the optical axis, among the rays that enter with an angle of −45 degrees to the optical axis, in a case where the focal length of the entire optical system is normalized to 1.

Here, as for the angle of entrance to the optical system in the embodiment, the clockwise direction measured from the optical axis is positive, and the anti-clockwise direction is negative.

In FIG. 1, the left side corresponds to the front side an object side for an image-taking optical system or the like, and a magnifying side (a screen side) for a projection optical system of a liquid crystal projector or the like), and the right side corresponds to the rear side (an image side for the image-taking optical system or the like, and a demagnifying side (an original image side) for the projection optical system of the liquid crystal projector or the like).

The optical system OL shown in FIG. 1 is an optical system in which the maximum value $h_{Gp}$ of height from the optical axis La of a passing point of the paraxial marginal ray Q on a lens surface that is located on the front side of the point P where the paraxial chief ray R crosses the optical axis La, is larger than the maximum value $h_{Gn}$ of height from the optical axis La of a passing point of the paraxial marginal ray Q on a lens surface that is located on the demagnifying side (image side) of the point P.

Abbe's numbers of the solid material used for the optical members in the present invention are as follows.

When refractive indexes for the g-line, F-line, d-line and C-line in Fraunhofer lines are represented by Ng, NF, Nd and NC, respectively, the definition of Abbe's number νd and partial dispersion ratios θgd and θgF is the same as that used in general, it being shown by the following equations:

$$\nu d=(Nd-1)/(NF-NC)$$

$$\theta gd=(Ng-Nd)/(NF-NC)$$

$$\theta gF=(Ng-NF)/(NF-NC).$$

The optical system of the present invention comprises at least one refractive optical element GIT made of a solid material that its Abbe's number νd and partial dispersion ratios θgd and θgF satisfy the following conditions:

$$\nu d < 30 \quad (1)$$

$$\theta gd < -3.333 \times 10^{-3} \nu d + 1.40 \quad (2)$$

$$\theta gF < -2.615 \times 0^{-3} \nu d + 0.67. \quad (3)$$

The solid materials that satisfy the conditional expressions (1) to (3) include a material made of Indium-Tin Oxide (ITO), for example. The optical system in FIG. 1 is characterized by the following (A) and (B).

(A) The refractive optical element GIT has a negative refractive power in a case where the refractive optical element GIT is located on the front side (the object side or the magnifying side) of the point P.

(B) The refractive optical element GIT has a positive refractive power in a case where the refractive optical element GIT is located on the rear side (the image side or the demagnifying side) of the point P.

Here, the refractive power of the refractive optical element GIT is shown by the refractive power when both two refractive surfaces that constitute the refractive optical element GIT face air (a medium with a refractive power of 1).

In the embodiment shown in FIG. 1, using the refractive optical element GIT in at least one of the front unit Gn and the rear unit Gp makes possible obtaining an optical system suitable for the object of the present invention.

The features by the use of an optical member made of the solid material that satisfies the above-mentioned conditional expressions (1) to (3) for the optical system will be explained.

First, an action on aberration correction of the optical system when using an optical material with high dispersion will be explained.

When the refractive power change of a surface of a refracting lens is represented by $\Delta\psi$, the Abbe's number of the material is represented by ν, and the heights of points where the paraxial marginal ray and paraxial chief ray pass through the lens surface are represented by h and H, respectively, the change $\Delta L$ of longitudinal chromatic aberration coefficients on the lens surface, and the change $\Delta T$ of chromatic aberration of magnification coefficients on the lens surface are shown as follows:

$$\Delta L = h^2 \cdot \Delta\psi/\nu \quad (a)$$

$$\Delta T = h \cdot H \cdot \Delta\psi/\nu. \quad (b)$$

As is clear from the expressions (a) and (b), each change of the aberration coefficients $\Delta L$ and $\Delta T$ for the refractive power change $\Delta\psi$ of the lens surface increases with decreasing the absolute value of Abbe's number ν (that is, increasing the dispersion). Therefore, using a high dispersion material with a small absolute value of Abbe's number ν makes the amount of the refractive power change $\Delta\psi$ for obtaining a required chromatic aberration small. This means that the chromatic aberration can be controlled without a large impact on spherical aberration, coma aberration and astigmatism or the like in the aberration theory, and thereby the independence of the chromatic aberration correction rises.

In contrast, using a low dispersion material increases the amount of the refractive power change $\Delta\psi$ for obtaining a required chromatic aberration. Therefore, various aberrations such as spherical aberration changes greatly with it, and thereby the independence of the chromatic aberration correction weakens. Therefore, it is important in the aberration correction that a lens surface of at least one lens among the lenses constituting the optical system is a refractive lens surface formed of a high dispersion material.

Next, actions on the aberration correction of an optical material with a low partial dispersion ratio will be explained, based on its high dispersion.

It is well known that, in wavelength dependence characteristics (dispersion characteristic) of refractive index of optical materials, Abbe's number shows an inclination of the entire dispersion characteristic curve, and the partial dispersion ratio shows a degree of curving of the dispersion characteristic curve.

Generally, in optical materials, the refractive index on a short wavelength side is higher (Abbe's number is a positive value) than that on a long wavelength side, and a dispersion characteristic curve has a shape that is convex downward (that is, the value of the partial dispersion ratio is positive), the change of refractive index for the change of wavelength increasing with shortening the wavelength. Moreover, the higher dispersion of the optical material with a smaller Abbe's number increases its partial dispersion ratio, and thereby the dispersion characteristic curve has a stronger tendency to be convex downward.

In optical materials with large partial dispersion ratios, the wavelength dependence characteristic curve of chromatic aberration coefficients on the lens surface made of the material shows a larger curvature on the short wavelength side, compared with a case where a material with a small partial dispersion ratio is used. At this time, the change of the chromatic aberration coefficient for controlling the chromatic aberration causes the rotational change of the entire inclination of the wavelength dependence characteristic curve of chromatic aberration coefficients around a position of a design standard wavelength.

In this change of the inclination, especially, the change amount on the short wavelength side becomes larger in a material with a large partial dispersion ratio than in a material with a small partial dispersion ratio; the entire inclination changes with a great change of the curvature. Therefore, it becomes difficult to obtain the structure that can cancel the entire inclination and the curvature of the wavelength dependence characteristic curve of chromatic aberration coefficients even if the material of other refractive system portions is changed, and thereby the chromatic aberration correction in the entire wavelength region becomes impossible.

This will be explained in detail, by using an example of achromatism in the optical system constituted by a refractive optical system portion (refractive optical element) GIT made of a material that satisfies the conditional expressions (1) to (3), and a refractive optical system portion (refractive optical element) G made of a material that does not satisfy the conditional expressions (1) to (3).

In the optical system that the achromatism is done by using a high dispersion optical material, the chromatic aberration of the entire system is corrected by canceling comparatively large chromatic aberration coefficients mutually between the refractive optical system portion GIT and the refractive optical system portion G. For this achromatism, from a state in which the chromatic aberration of the refractive optical system portion G that is one of the system portions, has been corrected in some degree, a material of a positive lens constituting the refractive optical system portion G that has a comparatively high dispersion is selected, and a material of a negative lens constituting the refractive optical system portion G that has a comparatively low dispersion is selected.

Then, the entire inclination of the wavelength dependence characteristic curve of chromatic aberration coefficients of the refractive optical system portion G changes, with increase of its linearity more than the former state.

In this state, the refractive optical system portion GIT is provided with an adequate refractive power to cancel the entire inclination of the wavelength dependence characteristic curve of chromatic aberration coefficients of the refractive optical system portion G. However, in a case where the refractive optical system portion GIT is formed by an optical material with a large partial dispersion ratio, since the wavelength dependence characteristic curve of chromatic aberration coefficients of the refractive optical system portion GIT has a larger curvature than that of the refractive optical system portion G in the opposite direction, a component of the curvature cannot be canceled though a component of the entire inclination can be canceled.

In contrast, in a case where the refractive optical system portion GIT is formed by an optical material with a small partial dispersion ratio, since the wavelength dependence characteristic curve of chromatic aberration coefficients of the refractive optical system portion GIT has linearity comparatively, the inclination can be changed rotationally around the position of the design wavelength while maintaining the linearity comparatively even if the refractive power is changed to control the chromatic aberration. Therefore, the inclination component and the curvature component of the wavelength dependence characteristic curve of chromatic aberration coefficients can be canceled at the same time comparatively easily by using the refractive optical system portion GIT and refractive optical system portion G.

In other words, it is important that the material of the refractive optical system portion GIT is an optical material with a low partial dispersion ratio as well as high dispersion. The refractive optical element used in the optical system of the present invention satisfies the conditional expressions (1), (2) and (3), these conditional expressions showing the relation between Abbe's numbers and partial dispersion ratios for correcting the chromatic aberration excellently, based on the principle explained above.

The above-mentioned Abbe's number $\nu d$ is the Abbe's number of the refractive optical system portion (lens or layer) GIT.

Moreover, the above-mentioned partial dispersion ratios $\theta gd$ and $\theta gF$ are the partial dispersion ratios of the refractive optical system portion (lens or layer) GIT.

It is not preferable that a material of the refractive optical element used in the optical system does not satisfy at least one of the above-mentioned conditional expressions (1) to (3) because an excellent correction of the chromatic aberration in the entire optical system becomes difficult.

Setting the numerical range of the conditional expression (1) to the following range increases the effect on chromatic aberration correction, and thereby an excellent optical performance can be obtained.

$$\nu d < 20 \qquad (1a)$$

Preferably, the numerical range can be set to the following range.

$$\nu d < 18 \qquad (1b)$$

More preferably, the numerical range can be set to the following range.

$$\nu d < 16 \qquad (1c)$$

Still more preferably, the numerical range can be set to the following range.

$$\nu d < 14 \qquad (1d)$$

Setting the numerical ranges of the conditional expressions (2) and (3) to the following ranges, based on satisfying one of the conditional expressions (1), (1a), (1b), (1c) and (1d), gives a more excellent optical performance. Preferably, the numerical ranges can be set to the following ranges.

$$\theta gd < -3.333 \times 10^{-3} \cdot vd + 1.25 \quad (2b)$$

$$\theta gF < -2.615 \times 10^{-3} \cdot vd + 0.56 \quad (3b)$$

More preferably, the numerical ranges can be set to the following ranges.

$$\theta gd < -3.333 \times 10^{-3} \cdot vd + 1.2375 \quad (2c)$$

$$\theta gF < -2.615 \times 10^{-3} vd + 0.55 \quad (3c)$$

Still more preferably, the numerical ranges can be set to the following ranges.

$$\theta gd < 1.1137 \quad (2d)$$

$$\theta gF < 0.47 \quad (3d)$$

The conditions that the optical material forming the refractive optical element GIT should satisfy have been described above.

Next, conditions that the refractive optical element GIT should satisfy, which are effective for the correction of chromatic aberration of the optical system of the telephoto type will be explained by using FIG. 1.

First, an optical system in which the refractive optical element GIT has not been introduced will be explained. The expressions of the longitudinal chromatic aberration coefficient $L(\lambda)$ and the chromatic aberration of magnification coefficient $T(\lambda)$ for the front unit Gp and the rear unit Gn are as follows, respectively:

$$L(\lambda) = h_{Gp}^2(\lambda_0) \sum_{i=1}^{L} \phi_{Gpi}(\lambda_0)/v_{Gpi}(\lambda) + h_{Gn}^2(\lambda_0) \sum_{j=1}^{M} \phi_{Gnj}(\lambda_0)/v_{Gnj}(\lambda) \quad (c)$$

$$T(\lambda) = h_{Gp}(\lambda_0) H_{Gp}(\lambda_0) \sum_{i=1}^{L} \phi_{Gpi}(\lambda_0)/v_{Gpi}(\lambda) + h_{Gn}(\lambda_0) H_{Gn}(\lambda_0) \sum_{j=1}^{M} \phi_{Gnj}(\lambda_0)/v_{Gnj}(\lambda) \quad (d)$$

where $$v_{Gpi}(\lambda) = \{N_{Gpi}(\lambda_0) - 1\}/\{N_{Gpi}(\lambda) - N_{Gpi}(\lambda_0)\}$$

$$v_{Gni}(\lambda) = \{N_{Gni}(\lambda_0) - 1\}/\{N_{Gnj}(\lambda) - N_{Gnj}(\lambda_0)\}$$

$\psi_{Gpi}$: the refractive power of each thin single lens constituting the front unit Gp $\psi_{Gni}$: the refractive power of each thin single lens constituting the rear unit Gn $v_{Gpi}$: Abbe's number of each thin single lens constituting the front unit Gp $v_{Gni}$: Abbe's number of each thin single lens constituting the rear unit Gn $h_{Gp}$: the height of the paraxial marginal ray that makes incident on the front unit Gp $h_{Gn}$: the height of the paraxial marginal ray that makes incident on the rear unit Gn $H_{Gp}$: the height of the paraxial chief ray that makes incident on the front unit Gp $H_{Gn}$: the height of the paraxial chief ray that makes incident on the rear unit Gn $N_{Gpi}$: the refractive index of each thin single lens constituting the front unit Gp $N_{Gni}$: the refractive index of each thin single lens constituting the rear unit Gn $\lambda$: an optional wavelength $\lambda_0$: a design wavelength.

Generally, in an optical system of the telephoto type, the wavelength dependence characteristic of the longitudinal chromatic aberration coefficient of the front unit Gp, which is the first term in the expression (c) of the wavelength dependence characteristic of the longitudinal chromatic aberration coefficient $L(\lambda)$, has a negative entire inclination and a comparatively strong tendency to be convex upward. The wavelength dependence characteristic of longitudinal chromatic aberration coefficients of the rear unit Gn, which is the second term in the expression (c), has a positive entire inclination and a tendency to be convex downward. As a result, the wavelength dependence characteristic of longitudinal chromatic aberration coefficients $L(\lambda)$ of the entire optical system has a negative entire inclination and a tendency to be convex upward because the characteristic of the front unit Gp slightly remains.

Next, the sign of the refractive optical element GIT and the introducing location thereof in the optical system from this state, for correcting the longitudinal chromatic aberration, will be explained.

Herein, the refractive power of the refractive optical element GIT is represented by $\phi_{GIT}(\lambda_0)$, the height of the paraxial marginal ray that makes incident on the refractive optical element GIT is represented by $h_{GIT}(\lambda_0)$, and the longitudinal chromatic aberration coefficient $L_{GIT}(\lambda)$ of the introduced refractive optical element GIT is expressed as the following expression:

$$L_{GIT}(\lambda) = h_{GIT}^2(\lambda_0) \psi_{GIT}(\lambda_0)/v_{GIT}(\lambda) \quad (e)$$

where, $v_{GIT}(\lambda) = \{N_{GIT}(\lambda_0) - 1\}/\{N_{GIT}(\lambda) - N_{GIT}(\lambda_0)\}$.

In the expression (e), because $1/v_{GIT}(\lambda)$ reflects the tendencies of the inclination and curvature components of the dispersion characteristic $N_{GIT}(\lambda)$ of the material used for the refractive optical element GIT as they are, the wavelength dependence characteristic of longitudinal chromatic aberration coefficients of the refractive optical element GIT becomes a curve which has a negative entire inclination and is gently convex downward when $\psi_{GIT}(\lambda_0) > 0$, and becomes a curve which has a positive entire inclination and is gently convex upward when $\psi_{GIT}(\lambda_0) < 0$.

Therefore, canceling the entire inclination component of the wavelength dependence characteristic curve of longitudinal chromatic aberration coefficients, shown by the expression (c), requires the condition of $\psi_{GIT}(\lambda_0) < 0$. At this time, although the curvature component increases, it can be solved by setting the wavelength dependence characteristic curve of longitudinal chromatic aberration coefficients of the entire system besides the refractive optical element GIT to a curve having a negative large inclination and being convex downward, by selecting a grass material with higher dispersion (that is, the curvature of the dispersion characteristic is larger) as the material of a positive lens constituting the front unit Gp and a grass material with lower dispersion (that is, the curvature of the dispersion characteristic is smaller) as a material of a negative lens constituting the front unit Gp.

The entire inclination that has been shifted greatly by the change of the grass material can be corrected only by changing the refractive power $\psi_{GIT}(\lambda_0)$ of the refractive optical element GIT in the negative direction again. As a result, the wavelength dependence characteristic of the longitudinal chromatic aberration coefficient, in which both the entire inclination component and the curvature component have been corrected excellently, can be obtained.

Since $h_{Gp}^2 \gg h_{Gn}^2$ is obtained from $h_{Gp} > h_{Gn}$, the introducing location in the optical system of the refractive optical element GIT is preferable to be in the front unit Gp where the refractive power of the refractive optical element GIT becomes comparatively small, and the change amount of the refractive power at the time of the chromatic aberration correction is comparatively small. Thereby, the independence of the chromatic aberration correction increases, and the refractive optical element GIT can have a wavelength dependence characteristic curve of the longitudinal chromatic aberration coefficient with comparatively high linearity.

In other words, the curvature component that is convex upward in the wavelength dependence characteristic curve of longitudinal chromatic aberration coefficients, which is increased by the refractive optical element GIT, can decrease, including the time of the chromatic aberration correction. Thereby, the wavelength dependence characteristic curve of the longitudinal chromatic aberration coefficient of the entire system besides the refractive optical element GIT can become a curve convex downward comparatively easily, without being given a large negative inclination.

The correction of the longitudinal chromatic aberration has been explained above.

Next, the correction of the chromatic aberration of magnification will be explained.

Generally, in an optical system of the telephoto type, the wavelength dependence characteristic of chromatic aberration of magnification coefficients of the front unit Gp, which is the first term in the expression (d) of the wavelength dependence characteristic of chromatic aberration of magnification coefficients $T(\lambda)$, has a positive entire inclination and a comparatively strong tendency to be convex downward. The wavelength dependence characteristic of chromatic aberration of magnification coefficients of the rear unit Gn, which is the second term in the expression (d), has a negative entire inclination and a tendency to be convex upward. As a result, the wavelength dependence characteristic of chromatic aberration of magnification coefficients $T(\lambda)$ of the entire optical system has a positive entire inclination and a tendency to be convex downward because the characteristic of the front unit Gp slightly remains.

The chromatic aberration of magnification coefficient $T_{GIT}(\lambda)$ of the refractive optical element GIT introduced into the front unit Gp for the longitudinal chromatic aberration correction as mentioned above is expressed as:

$$T_{GIT}(\lambda) = h_{Gp}(\lambda_0) H_{Gp}(\lambda_0) \psi_{GIT}(\lambda_0) / \nu_{GIT}(\lambda) \quad (f)$$

In the expression (f), because $1/\nu_{GIT}(\lambda)$ reflects the tendencies of the inclination and curvature components of the dispersion characteristic $N_{GIT}(\lambda)$ of the refractive optical element GIT as they are, the wavelength dependence characteristic of the chromatic aberration of magnification coefficient of the refractive optical element GIT becomes, from $h_{Gp}(\lambda_0) > 0$ and $H_{Gp}(\lambda_0) < 0$, a curve which has a negative entire inclination and is gently convex downward when $\psi_{GIT}(\lambda_0) < 0$. Therefore, the entire inclination component of the wavelength dependence characteristic of chromatic aberration of magnification coefficients shown by the expression (d) can be canceled, too.

At this time, although the curvature component increases, the wavelength dependence characteristic curve of chromatic aberration of magnification coefficients of the entire system besides the refractive optical element GIT becomes a curve which is convex upward and has a large positive inclination, and the curvature component thereof is canceled at the same time by selecting a grass material with higher dispersion (that is, the curvature of the dispersion characteristic is larger) as the material of the positive lens constituting the front unit Gp and a grass material with lower dispersion (that is, the curvature of the dispersion characteristic is smaller) as the material of the negative lens constituting the front unit Gp when correcting the longitudinal chromatic aberration, as mentioned above.

The entire inclination that has shifted greatly by the change of the grass material is also corrected by changing the refractive power $\psi_{GIT}(\lambda_0)$ of the refractive optical element GIT in the negative direction again when correcting the longitudinal chromatic aberration, as mentioned above.

As explained above, the longitudinal chromatic aberration and chromatic aberration of magnification can be corrected at the same time by giving a negative refractive power to the refractive optical element GIT and introducing it into the front unit Gp with a positive refractive power.

Next, the sign of the refractive optical element GIT and the introducing location thereof in the optical system, in the specialized case of the correction of the chromatic aberration of magnification, will be explained.

The longitudinal chromatic aberration coefficient $L_{GIT}(\lambda)$ and the chromatic aberration of magnification coefficient $T_{GIT}(\lambda)$ in a case where the refractive optical element GIT is introduced into the rear unit Gn are expressed as follows:

$$L_{GIT}(\lambda) = h_{Gn}^2(\lambda_0) \psi_{GIT}(\lambda_0) / \nu_{GIT}(\lambda) \quad (g)$$

$$T_{GIT}(\lambda) = h_{Gn}^2(\lambda_0) \psi_{GIT}(\lambda_0) / \nu_{GIT}(\lambda\lambda). \quad (h)$$

Here, in the optical system of the telephoto type, as shown in FIG. 1, since $0 < h_{Gn}^2(\lambda_0) < H_{Gn}(\lambda_0)$, $$0 < h_{Gn}^2(\lambda_0) < h_{Gn}(\lambda_0) H_{Gn}(\lambda_0)$$

is established.

In other words, introducing the refractive optical element GIT into the rear unit Gn in the optical system of the telephoto type contributes to the chromatic aberration of magnification more than to the longitudinal chromatic aberration.

Therefore, in the expression (h), because $1/\nu_{GIT}(\lambda)$ reflects the tendencies of the inclination and curvature components of the dispersion characteristic $N_{GIT}(\lambda)$ of the refractive optical element GIT as they are, the wavelength dependence characteristic curve of the chromatic aberration of magnification coefficient, which has a negative entire inclination and is convex downward, can be obtained by setting $\phi_{GIT}(\lambda_0)$ to $\phi_{GIT}(\lambda_0) > 0$ when using the rear unit Gn. Thereby, the entire inclination component of the wavelength dependence characteristic of the chromatic aberration of magnification coefficient can be canceled with little impact on the longitudinal chromatic aberration.

At this time, the curvature component can be corrected easily by the selection of the grass material for the front unit Gp, as mentioned above.

The conditions that should be given to the refractive optical element GIT to correct the chromatic aberrations in the optical system of the telephoto type has been explained above.

As explained above, in the optical system of the present invention, when a point where the paraxial chief ray R crosses the optical axis La is defined as the point P, the maximum height $h_{Gp}$max from the optical axis of a passing point of the paraxial marginal ray Q on a lens surface that is located on the front side of the point P is larger than the maximum height $h_{Gn}$max from the optical axis of a passing point of the paraxial marginal ray Q on a lens surface that is located on the rear side of the point P. Moreover, the refractive optical element GIT has a negative optical power in the case where the refractive optical element GIT is located on the front side of the point P, and the refractive optical element GIT has a positive optical power in the case where the refractive optical element GIT is located on the rear side of the point P.

When the refractive optical element GIT is located on the front side of the point P, it is preferable that the refractive power given to the refractive optical element GIT is set within the following numerical range:

$$-2<\psi GIT1/\psi<0 \qquad (4a)$$

where

ψGIT1: the refractive power of the refractive optical element GIT that is located on the front side of the point P in the design wavelength ψ: the refractive power of the entire optical system in the design wavelength.

This can balance various aberrations such as chromatic aberration and spherical aberration, and can provide an excellent optical performance.

On the other hand, when the refractive optical element GIT is located on the rear side of the point P, it is preferable that the refractive power given to the refractive optical element GIT is set within the following numerical range:

$$0<\psi GIT2/\psi<4 \qquad (5a)$$

where

ψGIT2: the refractive power of the refractive optical element GIT that is located on the rear side of the point P in the design wavelength This can balance various aberrations such as chromatic aberration and spherical aberration, and can provide an excellent optical performance.

Preferably, the numerical range for the conditional expression (4a) is set to the following range.

$$-0.5<\phi GIT1/\phi<0 \qquad (4b)$$

Moreover, preferably, the numerical range for the conditional expression (5a) is set to the following range.

$$0<\phi GIT2/\phi<1 \qquad (5b)$$

Next, the concrete example of the material of the refractive optical element GIT will be described.

There is a composite that the following fine particles of an inorganic oxide are dispersed in a synthetic resin, as one of the concrete examples of the solid material (optical material) that satisfies the conditional expressions (1) to (3).

The inorganic oxide includes $TiO_2$ (nd=2.2652, vd=11.8), $Nb_2O_5$ (nd=2.367, vd=14.0), ITO (nd=1.8581, vd=5.53), $Cr_2O_3$ (nd=2.2178, vd=13.4), and $BaTiO_3$ (nd=2.4362, vd=11.3).

Figure 6:
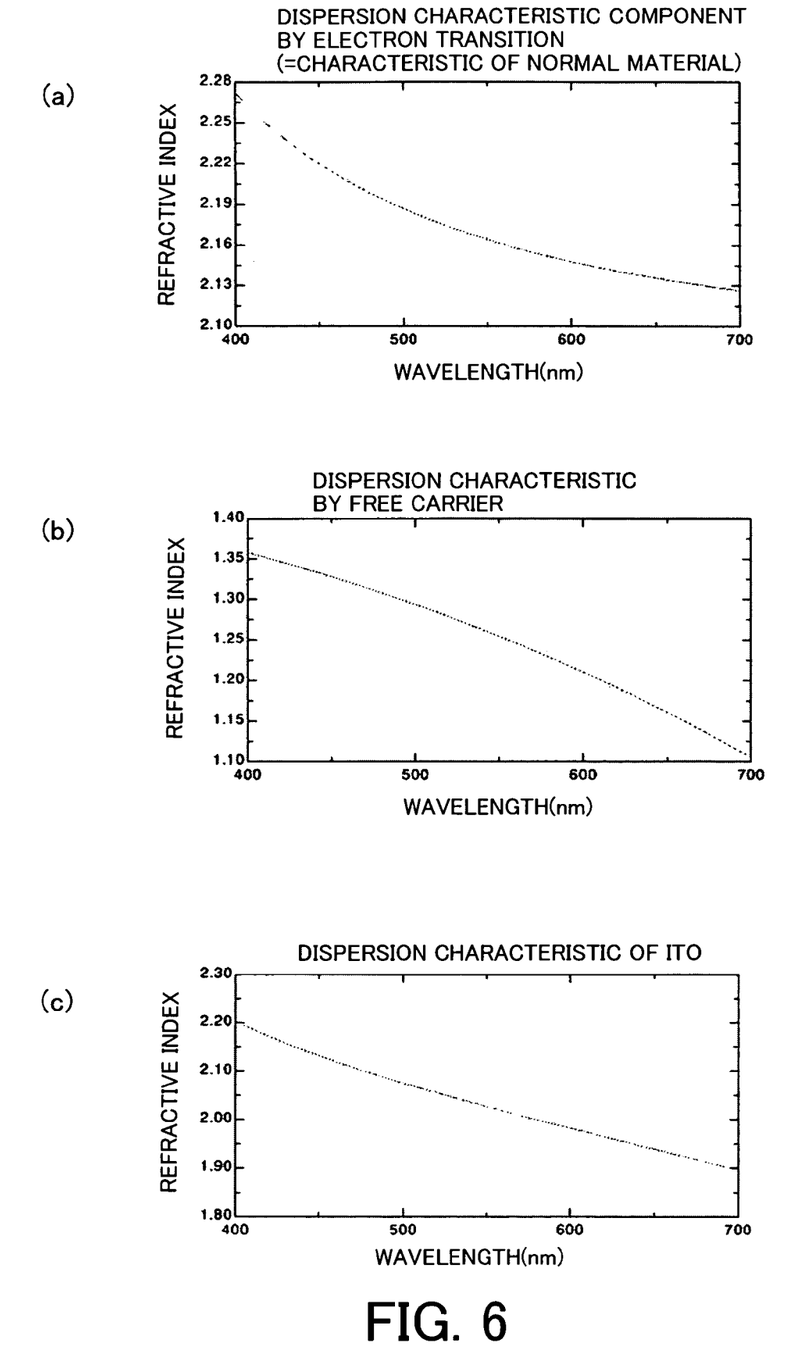
FIG. 6 is a schematic view for explaining the features of the dispersion characteristic of ITO.

Among these, ITO (Indium-Tin Oxide) is preferable because of its very small Abbe's number, compared with other materials. In ITO, unlike in normal materials, free carriers by electrical conductivity influence the refractive index. The refractive index dispersion characteristic of ITO (FIG. 6(c)) is formed by adding the refractive index dispersion of infrared region (FIG. 6(b)) by free carriers to the change refractive index dispersion of the refractive index (FIG. 6(a)) in a short wavelength region by normal electron transition. Thereby, ITO shows the wavelength dependency of dispersion characteristic in which Abbe's number vd has an abnormally large inclination of 5.53.

Moreover, the refractive index dispersion (FIG. 6(a)) by electron transition changes drastically on a short wavelength side in the visible region. On the other hand, the refractive index dispersion (FIG. 6(b)) by free carriers changes drastically on a long wavelength side in the visible region. The combination of the two influences makes the partial dispersion ratio of ITO smaller than normal ratios.

In addition, transparent materials as candidates in which the influence of free carriers is expected include $SnO_2$, ATO (antimony-doped $SnO_2$), and ZnO.

ITO is known as a material that composes a transparent electrode, and usually used for a liquid crystal display element and an EL (Electroluminescent) element, etc. Moreover, ITO is used for an infrared ray-shielding element and an ultraviolet ray-intercepting element as other usages. In the usage of ITO known so far, the thickness is limited within a range of 50 to 500 nm, and an example of use of a composite with fine particles as an optical member for chromatic aberration correction in optical systems, doesn't exist.

It is preferable that the average diameter of the particles of ITO is set within a range of 2 nm to 50 nm because of influences such as scattering. A dispersing agent can be added to the composite to suppress cohesion well.

Monomer is preferable as a medium material in which ITO is dispersed. Molding the composite by photo polymerization or heat polymerization can provide high mass production.

Moreover, it is preferable as for characteristics of an optical constant of monomer to use a monomer with a comparatively small Abbe's number, monomer with comparatively small partial dispersion, or monomer that satisfies both the conditions, the monomer including N-polyvinyl carbazole, styrene, and polymethyl methacrylate (acrylic resin). Although acrylic resin is used as a medium material in which ITO is dispersed in embodiments described below, the medium material is not limited thereto.

The dispersion characteristic N(λ) of a composite in which nano-particles are dispersed can be easily calculated by the following expression derived from Drude equation known well. That is, $$N(\lambda)=[1+V\{N_{ITO}^2(\lambda)-1\}+(1-V)\{N_P^2(\lambda)-\}]^{1/2} \qquad (c)$$

where λ represents an optional wavelength, $N_{ITO}$ represents the refractive index of ITO, $N_P$ represents the refractive index of polymer, and V represents the ratio of the total volume of ITO particles to the volume of the polymer.

In the optical system of the present invention, an optical member made of a material that satisfy the conditional expressions (1) to (3) is applied to a layer that is formed on a lens or lens surface in the optical system. And, making the refractive surface formed of the material aspheric can correct chromatic aberration flares such as chromatic spherical aberration more excellently.

Moreover, it is preferable to form an interface between the material and an atmosphere such as air, or a material having a comparatively low refractive index because a small change of the curvature of the interface causes a comparatively large change of chromatic aberrations.

Next, numerical embodiments of optical systems in which an refractive optical member made of a material that satisfy the conditional expressions (1) to (3) is used will be explained. In each embodiment, a material in which ITO fine particles are dispersed is used as the material satisfying the conditional expressions (1) to (3).

Figure 2:
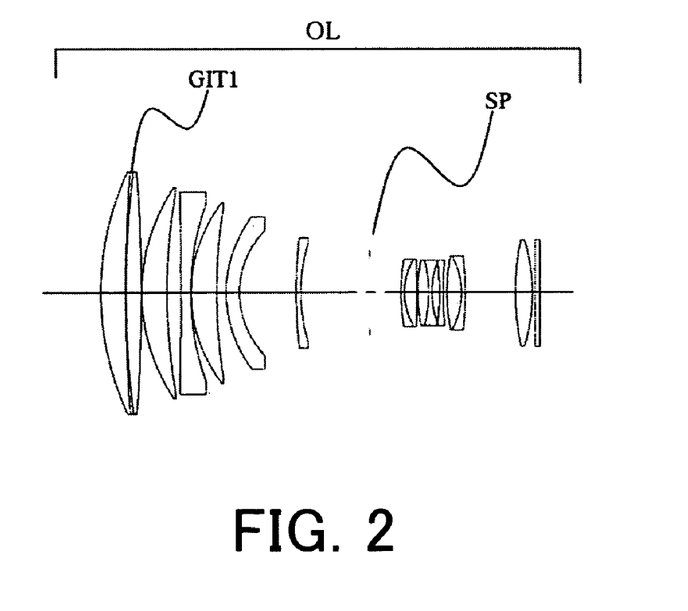
FIG. 2 is a sectional view showing an optical system of Numerical Embodiment 1 in the present invention.

FIG. 2 shows a cross section of the optical system OL of Numerical Embodiment 1. Numerical Embodiment 1 shows an example that uses the composite with ITO fine particles for the optical system of the telephoto type, the focal length of the optical system being 400 mm.

Figure 3:
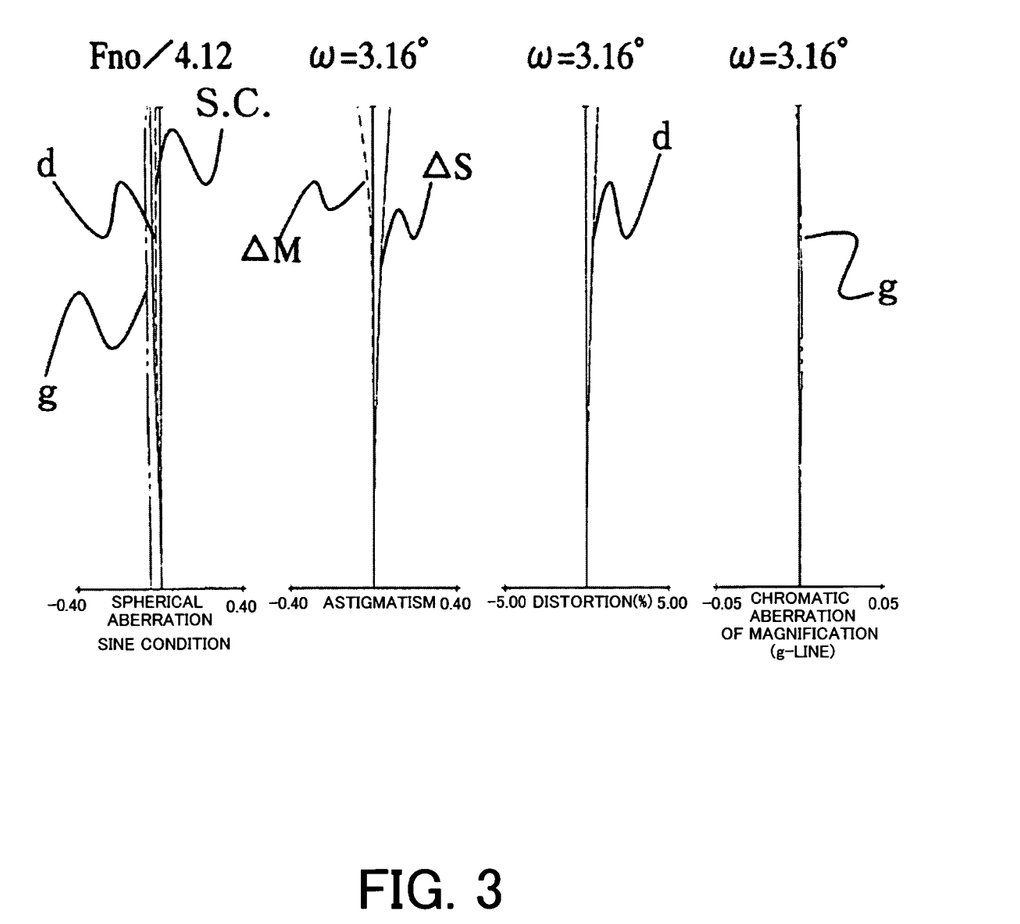
FIG. 3 shows aberration charts of the optical system of Numerical Embodiment 1 in in-focus state on an infinite object.

In FIG. 2, GIT1 represents a lens (layer) as the refractive optical element formed of the ITO composite. SP represents an aperture stop. FIG. 3 shows aberration charts of the optical system of Numerical Embodiment 1 in in-focus state on an infinite object. In the aberration charts, d represents the d-line, and g represents the g-line. S.C represents a sine condition, ΔM represents the meridional image plane, and ΔS represents the sagittal image plane. The chromatic aberration of magnification is expressed by using the g-line. In FIG. 2, the left side corresponds to the object side (magnifying side or front side), and the right side corresponds to the image side (demagnifying side or rear side). These are the same in another numerical embodiment.

The optical system of Numerical Embodiment 1 has introduced the refractive optical element GIT1 using ITO on the object side where the height of the passing position from the optical axis La of the paraxial marginal ray Q becomes comparatively large. In the optical system, the longitudinal chromatic aberration is corrected mainly by giving a negative refractive power to the lens GIT1 (layer) formed of the ITO composite. Thereby, a very compact optical system of the telephoto type with a telephoto ratio of 0.595 can be achieved.

Figure 4:
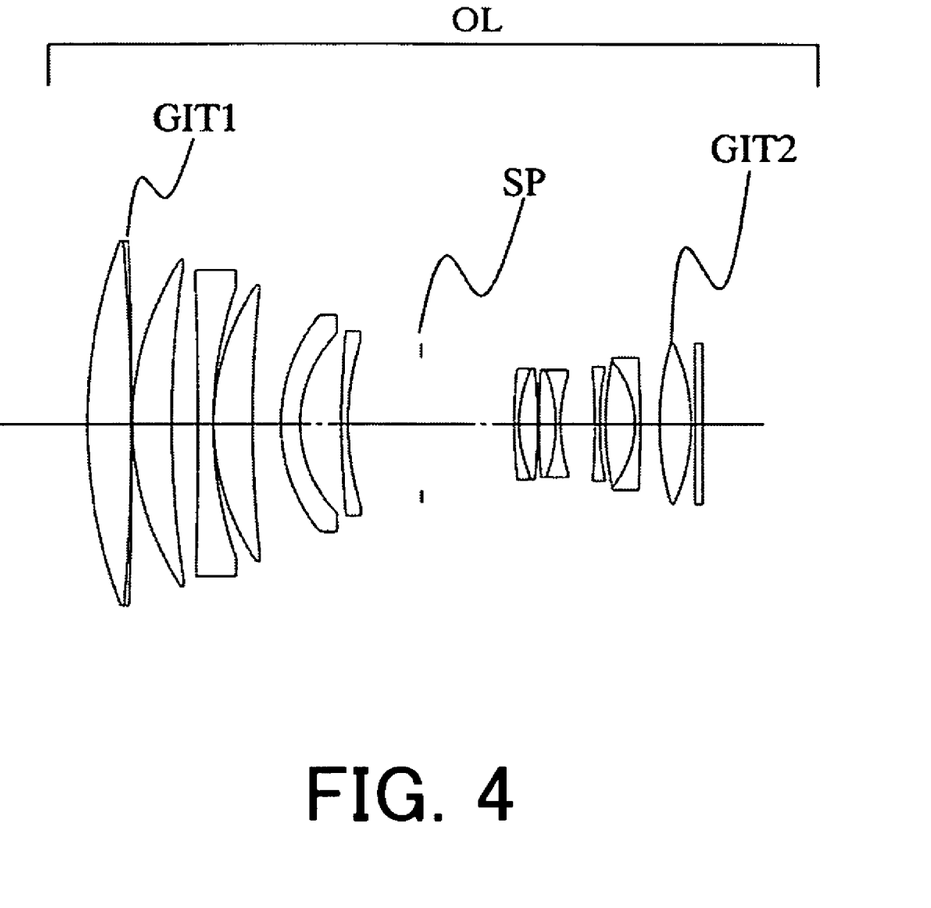
FIG. 4 is a sectional view showing an optical system of Numerical Embodiment 2 in the present invention.

FIG. 4 shows a cross section of the optical system OL of Numerical Embodiment 2. Numerical Embodiment 2 shows an example that uses the composite with ITO fine particles for the optical system of the telephoto type, the focal length of the optical system being 400 mm.

Figure 5:
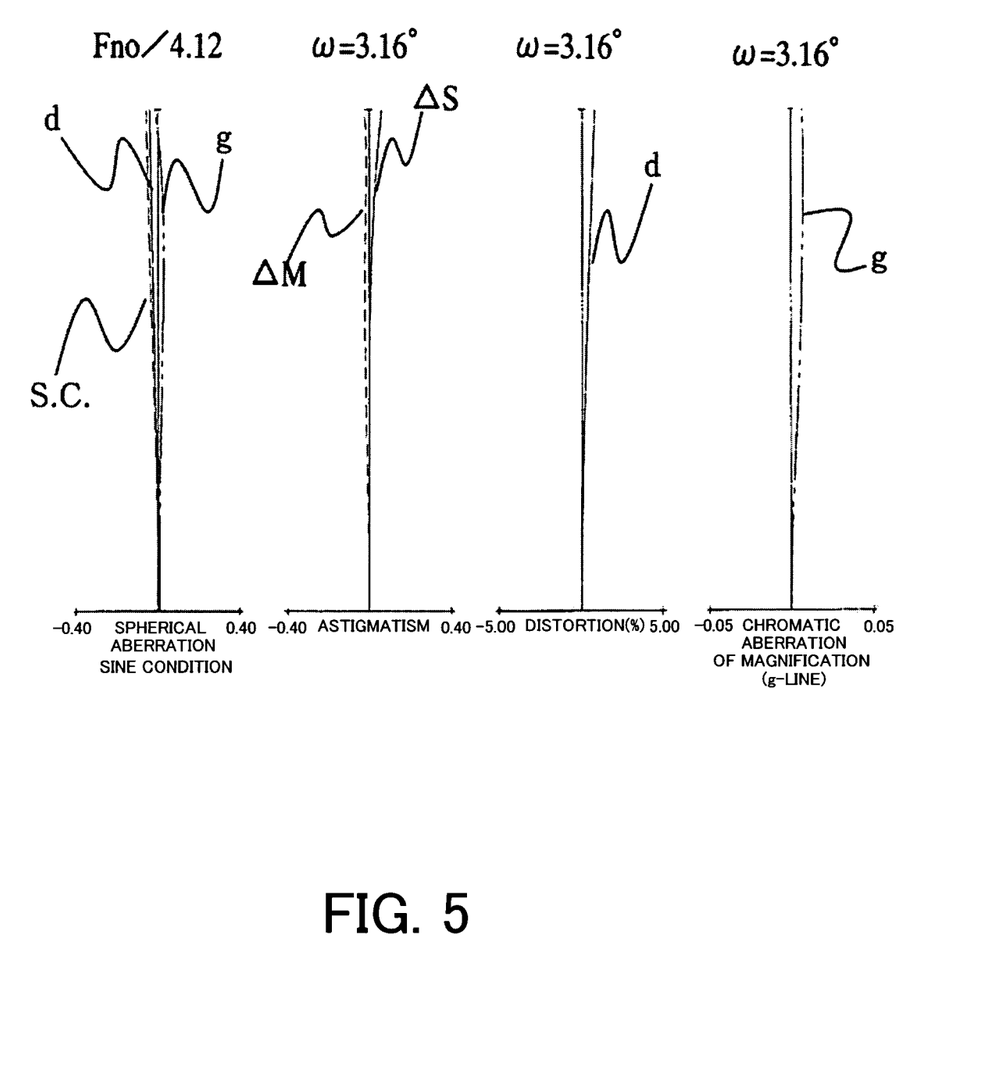
FIG. 5 shows aberration charts of the optical system of Numerical Embodiment 2 in in-focus state on an infinite object.

In FIG. 4, GIT1 and GIT2 represent lenses (layers) as the refractive optical elements formed of the ITO composite. SP represents an aperture stop. FIG. 5 shows aberration charts of the optical system of Numerical Embodiment 2 in in-focus state on an infinite object.

The optical system of Numerical Embodiment 2 has introduced the refractive optical element GIT1 on the object side where the height of the passing position of the paraxial marginal ray Q from the optical axis La becomes comparatively large.

Moreover, the optical system has also introduced the refractive optical element GIT2 on the image side from the aperture stop SP where the height of the passing position of the paraxial marginal ray Q from the optical axis La becomes comparatively small, and the height of the passing position of the paraxial chief ray R from the optical axis La becomes comparatively large.

In the optical system, the longitudinal chromatic aberration and chromatic aberration of magnification are corrected excellently by giving a negative refractive power to the lens GIT1 (layer) formed of the ITO composite, and giving a positive refractive power to the lens GIT2 (layer) formed of the ITO composite. Thereby, a very compact optical system of the telephoto type with a telephoto ratio of 0.573 can be achieved.

Hereinafter, the concrete numerical data of Numerical Embodiments 1 and 2 is shown. In each numerical embodiment, i represents the order counting from the object side, Ri represents a radius of curvature of the i-th optical surface (the i-th surface), and Di represents a distance on the optical axis between the i-th surface and the (i+1)-th surface. Ni and vi represent a refractive index and Abbe's number of a material of the i-th optical member (a lens (layer) formed of the ITO fine particle dispersed material is excluded) with reference to the d-line, respectively. The refractive index and Abbe's number of the lens GITj formed of the ITO fine particle dispersed material is shown by $N_{GIT}j$ and $v_{GIT}j$, (j=1,2, . . . ). f represents a focal length, Fno represents an F number, and ω represents a half field angle.

Moreover, aspheric shape is expressed as the following expression. x represents a displacement amount from a surface apex in the optical axis direction, and h represents a height from the optical axis in a direction orthogonal thereto.

r represents a paraxial radius of curvature, k represents a conic constant, and B, C, D, and E, represent aspheric coefficients of each order.

$$x(h) = \frac{(1/r) h^2}{1 + \sqrt{\{1 - (1+k)(h/r)^2\}}} + Bh^4 + Ch^6 + Dh^8 + Eh^{10} \ldots$$

In addition, "E±XX" in each aspheric coefficient means "$\times 10^{\pm XX}$".

The most image side plane (surface with a radius of curvature of ∞) in each numerical embodiment corresponds to an optical block such as an insertion filter, optical low-pass filter and infrared ray cutting filter.

In each numerical embodiment, ITO is used in a state of being dispersed in acrylic resin (PMMA) at a volume ratio of 20%. The refractive index of the composite of ITO and acrylic resin were calculated by using values computed by the above-mentioned expression (c). The refractive indexes, Abbe's numbers and partial dispersion ratios of simple ITO, simple acrylic resin and the composite with a composition ratio of ITO fine particles to acrylic resin of 20% for the d, g, C and F-lines are shown in Table 1. Moreover, the numerical values to the conditional expressions (4a) and (5a) of each numerical embodiment are shown in Table 2.

Although a fixed focal length telephoto lens has been explained in the above-mentioned embodiments, the optical system of the present invention is not limited thereto, and may be used for a zoom lens. The present invention can be applied to any of optical systems, in which the maximum height from an optical axis of a passing point of a paraxial marginal ray on a lens surface that is located on the front side of the point P is larger than the maximum height from the optical axis of a passing point of the paraxial marginal ray on a lens surface that is located on the rear side of the point P.

Especially, when the refractive optical element made of an ITO composite is installed on the front side of the point P, it is preferable to install it in a lens unit that the height of the passing point of the paraxial marginal ray measured from the optical axis becomes maximum in fixed focal length lenses and zoom lenses.

| NUMERICAL EMBODIMENT 1 | | | |
|---|---|---|---|
| f = 391.93 | Fno = 4.12 | 2ω = 6.32° | |
| R1 = 122.617 | D1 = 9.71 | N1 = 1.86723 | v1 = 42.2 |
| R2 = 661.755 | D2 = 0.20 | NGIT1 = 1.57159 | vGIT1 = 13.5 |
| *R3 = 406.479 (ASPHERIC SURFACE) | D3 = 6.11 | N2 = 1.48700 | v2 = 70.4 |

-continued

NUMERICAL EMBODIMENT 1

| | | | |
|---|---|---|---|
| R4 = −661.862 | D4 = 0.15 | | |
| R5 = 79.912 | D5 = 10.07 | N3 = 1.48700 | ν3 = 70.4 |
| R6 = 249.946 | D6 = 5.36 | | |
| R7 = −3949.515 | D7 = 4.00 | N4 = 1.86922 | ν4 = 30.5 |
| R8 = 111.753 | D8 = 0.15 | | |
| R9 = 62.093 | D9 = 10.24 | N5 = 1.48700 | ν5 = 70.4 |
| R10 = 226.601 | D10 = 3.77 | | |
| R11 = 52.863 | D11 = 5.30 | N6 = 1.88015 | ν6 = 37.1 |
| R12 = 37.793 | D12 = 22.65 | | |
| R13 = 219.518 | D13 = 1.80 | N7 = 1.43384 | ν7 = 95.1 |
| R14 = 73.014 | D14 = 27.79 | | |
| R15 = ∞(APERTURE STOP) | D15 = 12.76 | | |
| R16 = 91.128 | D16 = 1.30 | N8 = 1.85000 | ν8 = 23.0 |
| R17 = 28.601 | D17 = 4.87 | N9 = 1.56522 | ν9 = 42.2 |
| R18 = −374.421 | D18 = 0.30 | | |
| R19 = 74.227 | D19 = 4.34 | N10 = 1.80488 | ν10 = 24.2 |
| R20 = −53.740 | D20 = 1.30 | N11 = 1.88500 | ν11 = 41.0 |
| R21 = 37.108 | D21 = 3.12 | | |
| R22 = −85.901 | D22 = 1.30 | N12 = 1.85887 | ν12 = 42.7 |
| R23 = 115.410 | D23 = 1.60 | | |
| R24 = 85.205 | D24 = 5.77 | N13 = 1.68713 | ν13 = 29.3 |
| R25 = −31.635 | D25 = 1.40 | N14 = 1.88500 | ν14 = 41.0 |
| R26 = −168.381 | D26 = 20.24 | | |
| R27 = 108.004 | D27 = 6.92 | N15 = 1.50200 | ν15 = 61.5 |
| R28 = −72.792 | D28 = 1.00 | | |
| R29 = ∞ | D29 = 2.00 | N16 = 1.51633 | ν16 = 64.1 |
| R30 = ∞ | | | |

ASPHERIC COEFFICIENT

| | k | B | C | D | E |
|---|---|---|---|---|---|
| SURFACE 3 | −2.717293E+00 | −6.524983E−09 | −6.404411E−13 | 6.251491E−17 | 1.220879E−19 |

NUMERICAL EMBODIMENT 2 f = 392.03  Fno = 4.12  2ω = 6.32°

| | | | |
|---|---|---|---|
| R1 = 140.958 | D1 = 11.87 | N1 = 1.82075 | ν1 = 45.8 |
| R2 = −623.662 | D2 = 0.20 | NGIT1 = 1.57159 | νGIT1 = 13.5 |
| *R3 = −1545.484 (ASPHERIC SURFACE) | D3 = 0.15 | | |
| R4 = 83.759 | D4 = 10.44 | N2 = 1.50885 | ν2 = 68.1 |
| R5 = 290.960 | D5 = 7.10 | | |
| R6 = −1470.450 | D6 = 4.00 | N3 = 1.84356 | ν3 = 30.5 |
| R7 = 113.299 | D7 = 0.15 | | |
| R8 = 67.327 | D8 = 10.53 | N4 = 1.48700 | ν4 = 70.4 |
| R9 = 354.463 | D9 = 7.58 | | |
| R10 = 46.347 | D10 = 5.30 | N5 = 1.77373 | ν5 = 26.6 |
| R11 = 35.325 | D11 = 11.12 | | |
| R12 = 260.607 | D12 = 1.80 | N6 = 1.43384 | ν6 = 95.1 |
| R13 = 79.619 | D13 = 19.88 | | |
| R14 = ∞(APERTURE STOP) | D14 = 25.15 | | |
| R15 = 135.093 | D15 = 1.30 | N7 = 1.87172 | ν7 = 31.8 |
| R16 = 36.159 | D16 = 5.15 | N8 = 1.48700 | ν8 = 70.4 |
| R17 = −139.571 | D17 = 0.30 | | |
| R18 = 213.465 | D18 = 4.57 | N9 = 1.84915 | ν9 = 23.0 |
| R19 = −41.466 | D19 = 1.30 | N10 = 1.88500 | ν10 = 41.0 |
| R20 = 44.790 | D20 = 9.44 | | |
| R21 = −190.156 | D21 = 1.30 | N11 = 1.88500 | ν11 = 41.0 |
| R22 = 80.293 | D22 = 1.60 | | |
| R23 = 86.901 | D23 = 7.91 | N12 = 1.63906 | ν12 = 32.8 |
| R24 = −27.409 | D24 = 1.40 | N13 = 1.88500 | ν13 = 41.0 |
| R25 = −392.954 | D25 = 5.18 | | |
| *R26 = 67.383 (ASPHERIC SURFACE) | D26 = 0.05 | NGIT2 = 1.57159 | νGIT2 = 13.5 |
| R27 = 76.988 | D27 = 8.73 | N14 = 1.51515 | ν14 = 55.7 |
| R28 = −52.893 | D28 = 1.00 | | |
| R29 = ∞ | D29 = 2.00 | N15 = 1.51633 | ν15 = 64.1 |
| R30 = ∞ | | | |

-continued

NUMERICAL EMBODIMENT 2

ASPHERIC COEFFICIENT

| | k | B | C | D | E |
|---|---|---|---|---|---|
| SURFACE 3 | 1.961625E+02 | −9.401161E−09 | 1.032022E−13 | 6.250657E−17 | 5.916707E−21 |
| SURFACE 26 | −2.484499E+00 | −4.752855E−07 | −1.185466E−10 | 3.450231E−13 | −2.731250E−16 |

TABLE 1

| | ITO | PMMA | ITO 20% COMPOSITE |
|---|---|---|---|
| d-LINE REFRACTIVE INDEX | 1.85710 | 1.49171 | 1.57159 |
| g-LINE REFRACTIVE INDEX | 1.99250 | 1.50279 | 1.61267 |
| C-LINE REFRACTIVE INDEX | 1.79800 | 1.48917 | 1.55583 |
| F-LINE REFRACTIVE INDEX | 1.94870 | 1.49774 | 1.59815 |
| νd | 5.7 | 57.4 | 13.5 |
| θgd | 0.898 | 1.293 | 0.971 |
| θgF | 0.291 | 0.589 | 0.343 |

TABLE 2

| EMBODIMENT | | NUMERICAL EMBODIMENT 1 | NUMERICAL EMBODIMENT 2 |
|---|---|---|---|
| | ψ | 0.00255 | 0.00255 |
| | ψGIT1 | −0.00054 | −0.00055 |
| | ψGIT2 | — | 0.00106 |
| (4a) | ψGIT1/ψ | −0.213 | −0.214 |
| (5a) | ψGIT2/ψ | — | 0.416 |

Next, an embodiment of a digital still camera in which the optical system of the present invention is used as an image-taking optical system will be explained using FIG. 7.

Figure 7:
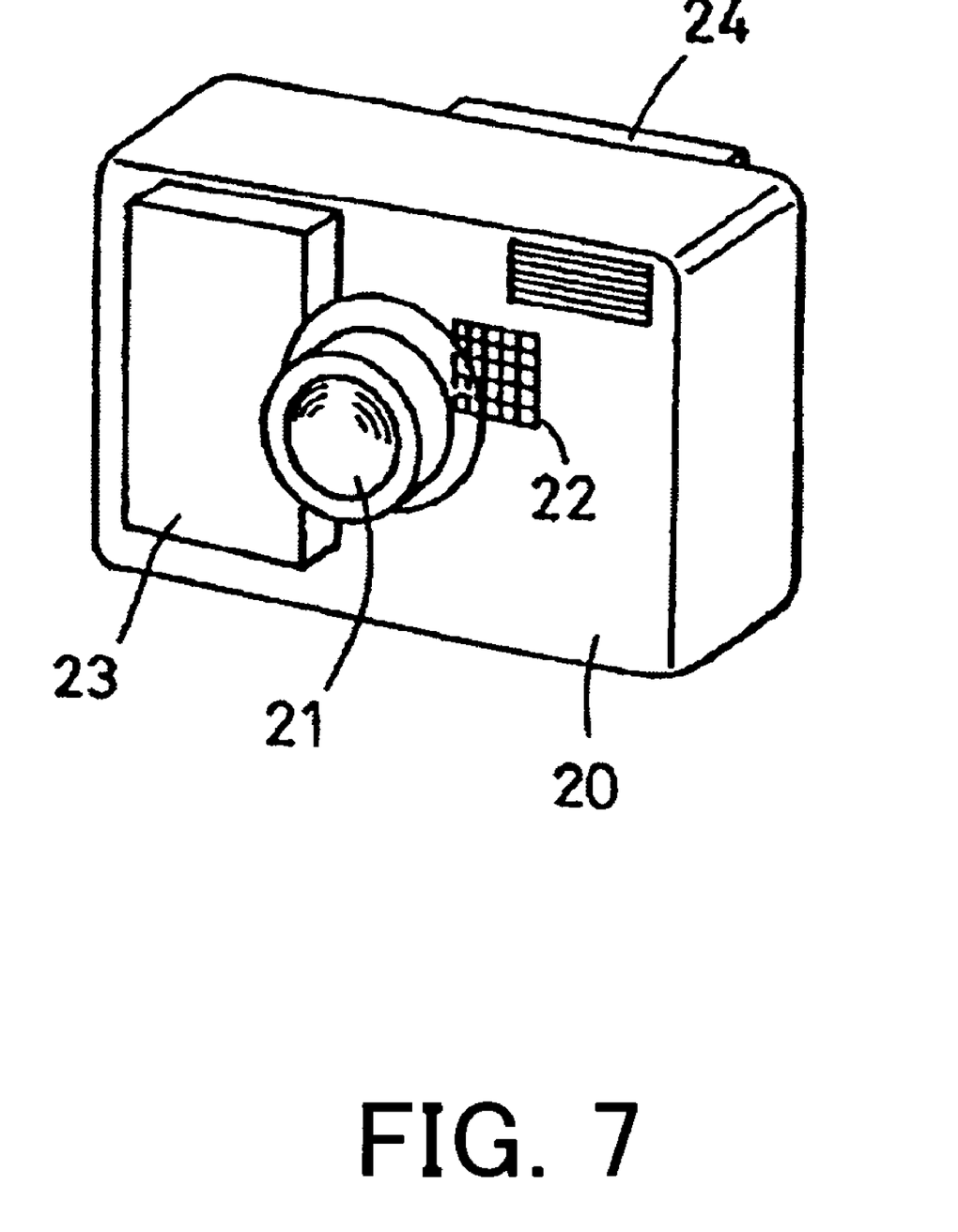
FIG. 7 is a schematic view showing substantial parts of an image-taking apparatus with the optical system of the present invention.

In FIG. 7, the reference numeral 20 denotes a main body of the camera, and the reference numeral 21 denotes an image-taking optical system constituted by the optical system of the present invention. The reference numeral 22 denotes a solid-state image-pickup element (photoelectrical conversion element), which is installed in the main body 20 and receives an object image formed by the image-taking optical system 21, such as a CCD sensor and CMOS sensor. The reference numeral 23 denotes a memory, which stores information corresponding to the object image that has been photoelectrically converted by the solid-state image-pickup element 22. The reference numeral 24 denotes a viewfinder to observe the object image formed on the solid-state image-pickup element 22, such as a liquid crystal display panel.

As explained above, applying the optical system of the present invention to an image-taking apparatus such as a digital still camera can achieve a compact image-taking apparatus with high optical performances.

In addition, the optical system of the present invention can be applied also to an observation optical system for a telescope and binoculars, a projection optical system for liquid crystal projector, and an optical system for a readout apparatus of a copier or the like, besides an image-taking apparatus such as a digital camera and a video camera.

This application claims priority from Japanese Patent Application No. 2004-022743 filed Jan. 30, 2004, which is hereby incorporated by reference herein.

What is claimed is:

1. An optical system, in which a maximum height from an optical axis of a passing point of a paraxial marginal ray on a lens surface that is located on a front side of a point P is larger than a maximum height from the optical axis of a passing point of the paraxial marginal ray on a lens surface that is located on a rear side of the point P, the point P being a point where a paraxial chief ray crosses the optical axis, the optical system comprising:
   a refractive optical element having refractive surfaces on a light-incident side and a light-emergent side, the refractive optical element being formed of a solid material that satisfies the following conditions:

$\nu d < 30$ $\theta gd < -3.333 \times 10^{-3} \cdot \nu d + 1.40$ $\theta gF < -2.615 \times 10^{-3} \cdot \nu d + 0.67$ where νd represents an Abbe's number, and θgd and θgF represent partial dispersion ratios,
   wherein the refractive optical element has a negative optical power in a case where the refractive optical element is located on the front side of the point P, and the refractive optical element has a positive optical power in a case where the refractive optical element is located on the rear side of the point P.

2. The optical system according to claim 1, wherein the following condition is satisfied:

$-2 < \psi GIT1 < 0$ where, in the case where the refractive optical element is located on the front side of the point P, ψGIT1 represents an optical power of the refractive optical element, and ψ represents an optical power of the entire optical system.

3. The optical system according to claim 1, wherein the following condition is satisfied:

$0 < \psi GIT2/\psi < 4$ where, in the case where the refractive optical element is located on the rear side of the point P, ψGIT2 represents an optical power of the refractive optical element, and ψ represents an optical power of the entire optical system.

4. The optical system according to claim 1, wherein the solid material is a composite that inorganic particles are dispersed in a transparent medium.

5. The optical system according to claim 4, wherein the inorganic particles are particles of Indium-Tin Oxide.

6. The optical system according to claim 1, wherein the solid material is molded by photo polymerization or heat polymerization.

7. The optical system according to claim 1, wherein the refractive optical element includes a aspheric surface.

8. The optical system according to claim 1, wherein at least one of the refractive surfaces on the light-incident side and the light-emergent side faces air.

9. The optical system according to claim 1, wherein the optical system forms an image on a photoelectric conversion element.

10. An optical system, in which its total lens length is shorter than its focal length, comprising:
   a refractive optical element having refractive surfaces on a light-incident side and a light-emergent side, the refractive optical element being formed of a solid material that satisfies the following conditions:

$vd<30$ $\theta gd<-3.333\times10^{-3}\cdot vd+1.40$ $\theta gF<-2.615\times10^{-3}\cdot vd+0.67$ where vd represents an Abbe's number, and θgd and θgF represent partial dispersion ratios,
   wherein the refractive optical element has a negative optical power in a case where the refractive optical element is located on a front side of a pupil position, and
   the refractive optical element has a positive optical power in a case where the refractive optical element is located on a rear side of the pupil position.

11. The optical system according to claim 10, wherein the following condition is satisfied:

$-2<\psi GIT1<0$ where, in the case where the refractive optical element is located on the front side of the pupil position, ψGIT1 represents an optical power of the refractive optical element, and ψ represents an optical power of the entire optical system.

12. The optical system according to claim 10, wherein the following condition is satisfied:

$0<\psi GIT2/\psi<4$ where, in the case where the refractive optical element is located on the rear side of the pupil position, ψGIT2 represents an optical power of the refractive optical element, and ψ represents an optical power of the entire optical system.

13. The optical system according to claim 10, wherein the solid material is a composite that inorganic particles are dispersed in a transparent medium.

14. The optical system according to claim 13, wherein the inorganic particles are particles of Indium-Tin Oxide.

15. The optical system according to claim 10, wherein the solid material is molded by photo polymerization or heat polymerization.

16. The optical system according to claim 10, wherein the refractive optical element includes a aspheric surface.

17. The optical system according to claim 10, wherein at least one of the refractive surfaces on the light-incident side and the light-emergent side faces air.

18. The optical system according to claim 10, wherein the optical system forms an image on a photoelectric conversion element.

19. An image-taking apparatus comprising:
   the optical system according to claim 1; and
   a photoelectric conversion element which receives an image formed by the optical system.

20. An image-taking apparatus comprising:
   the optical system according to claim 10; and
   a photoelectric conversion element which receives an image formed by the optical system.

21. An optical apparatus comprising:
   the optical system according to claim 1.

22. An optical apparatus comprising:
   the optical system according to claim 10.

23. An optical system, in which a maximum height from an optical axis P is larger than a maximum height from the optical axis of a passing point of the paraxial marginal ray on a lens surface that is located on a rear side of the point P, the point P being a point where a paraxial chief ray crosses the optical axis, the optical system comprising;
   a refractive optical element having refractive surfaces on a light-incident side and a light- emergent side, the refractive optical element being formed of a solid material that satisfies the following conditions:

$vd<30$ $\theta gd<-3.333\times10^{-3}\cdot vd+1.40$ $\theta gF<-2.615\times10^{-3}\cdot vd+0.67$ where vd represents an Abbe's number, and θgd and θgF represent partial dispersion ratios,
   wherein the refractive optical element is located on the front side of the point P and the refractive optical element has a negative optical power.

24. The optical system according to claim 23, wherein the following condition is satisfied:

$-2<\psi GIT1<0$ where ψGIT1 represents an optical power of the refractive optical element, and ψ represents an optical power of the entire optical system.

25. The optical system according to claim 23, wherein optical system forms an image on a photoelectric conversion element.

26. An optical, system, in which a maximum height from an optical axis of a passing point of a paraxial marginal ray on a lens surface that is located on a front side of a point P is larger than a maximum height from the optical axis of a passing point of the paraxial marginal ray on a lens surface that is located on a rear side of the point P, the point P being a point where a paraxial chief ray crosses the optical axis, the optical system comprising: of a passing point of a paraxial marginal ray on a lens surface that is located on a front side of a point
   a refractive optical element having refractive surfaces on a light-incident side and a light- emergent side, the refractive optical element being formed of a solid material that satisfies the following conditions:

$vd<30$ $\theta gd<-3.333\times10^{-3}\cdot vd+1.40$ $\theta gF<-2.615\times10^{-3}\cdot vd+0.67$ where vd represents an Abbe's number, and Ogd and OgF represent partial dispersion ratios,
   wherein the refractive optical element is located on the rear side of the point P and the refractive optical element has a positive optical power.

27. The optical system according to claim 26, wherein the following condition is satisfied:

$0<\psi GIT2/\psi<4$ where ψGIT2 represents an optical power of the refractive optical element, and ψ represents an optical power of the entire optical system.

28. The optical system according to claim 26 wherein the optical system forms an image on a photoelectric conversion element.

29. An optical system, in which its total lens length is shorter than its focal length, comprising:
a refractive optical element having refractive surfaces on a light-incident side and a light- emergent side, the refractive optical element being formed of a solid material that satisfies the following conditions:
vd<30
θgd<−3.333×10$^{-3}$·vd+1.40
θgF<−2.615×10$^{-3}$·vd+0.67
where vd represents an Abbe's number, and θgd and θgF represent partial dispersion ratios,
wherein the refractive optical element is located on a front side of a pupil position and the refractive optical element has a negative optical power.

30. The optical system according to claim 29, wherein the following condition is satisfied:
−2<ψGIT1<0
where ψGIT1 represents an optical power of the refractive optical element, and ψ represents an optical power of the entire optical system.

31. The optical system according to claim 29, wherein the optical system forms an in we on a photoelectric conversion element.

32. An optical system, in which its total lens length is shorter than its focal length, comprising:
a refractive optical element having refractive surfaces on a light-incident side and a light- emergent side, the refractive optical element being formed of a solid material that satisfies the following conditions:
vd<30
θgd<−3.333×10$^{-3}$·vd+1.40
θgF<−2.615×10$^{-3}$·vd+0.67
where vd represents an Abbe's number, and Ogd and OgF represent partial dispersion ratios,
wherein the refractive optical element is located on a rear side of the pupil position and the refractive optical element has a positive optical power.

33. The optical system according to claim 32, wherein the following condition is satisfied:
0<ψGIT2/ψ>4
where ψGIT2 represents an optical power of the refractive optical element, and ψ represents an optical power of the entire optical system.

34. The optical system according to claim 33, wherein the optical system forms an image on a photoelectric conversion element.

35. An image-taking apparatus comprising:
the optical system according to claim 23; and
a photoelectric conversion element which receives an image formed by the optical system, 36. An image-taking apparatus comprising:
the optical system according to claim 26; and
a photoelectric conversion element which receives an image formed by the optical system.

37. An image-taking apparatus comprising:
the optical system according to claim 29; and
a photoelectric conversion element which receives an image formed by the optical system.

38. An image-taking apparatus comprising:
the optical system according to claim 32; and
a photoelectric conversion element which receives an image formed by the optical system.

39. An optical apparatus comprising: the optical system according to claim 23.

40. An optical apparatus comprising: the optical system according to claim 26.

41. An optical apparatus comprising: the optical system according to claim 29.

42. An optical apparatus comprising: the optical system according to claim 32.

* * * * *

UNITED STATES PATENT AND TRADEMARK OFFICE
CERTIFICATE OF CORRECTION

PATENT NO. : 7,057,831 B2
APPLICATION NO. : 11/045742
DATED : June 6, 2006
INVENTOR(S) : Hideki Ogawa It is certified that error appears in the above-identified patent and that said Letters Patent is hereby corrected as shown below:

Column 22

Line 10, after "an optical axis" insert –of a passing point of a paraxial marginal ray on a lens surface that is located on a front side of a point--.

Lines 44-46, after "comprising:" delete "of a passing point of a paraxial marginal ray on a lens surface that is located on a front side of a point" .

Line 54, replace "Ogd and OgF" with "θgd and θgF".

Column 23

Line 33, replace "Ogd and OgF" with "θgd and θgF".

Signed and Sealed this

Fifteenth Day of August, 2006

JON W. DUDAS
*Director of the United States Patent and Trademark Office*